United States Patent
Ha et al.

(10) Patent No.: US 8,236,459 B2
(45) Date of Patent: Aug. 7, 2012

(54) HYBRID TYPE POWER SUPPLYING APPARATUS

(75) Inventors: Heung Yong Ha, Seoul (KR); Han-ik Joh, Seoul (KR); Tae Jung Ha, Seoul (KR); Soo-Kil Kim, Seoul (KR); Hyoung-Juhn Kim, Suwon-si (KR); Tae Hoon Lim, Seoul (KR); Suk-woo Nam, Seoul (KR); In-Hwan Oh, Seoul (KR); Seong-Ahn Hong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 918 days.

(21) Appl. No.: 12/249,197

(22) Filed: Oct. 10, 2008

(65) Prior Publication Data

US 2009/0208793 A1 Aug. 20, 2009

(30) Foreign Application Priority Data

Feb. 15, 2008 (KR) .................. 10-2008-0014068

(51) Int. Cl.
*H01M 8/04* (2006.01)
(52) U.S. Cl. .......................................... 429/428
(58) Field of Classification Search .............. 429/428, 429/429–432, 444, 454
See application file for complete search history.

(56) References Cited

U.S. PATENT DOCUMENTS

| | | | |
|---|---|---|---|
| 6,266,576 B1 | 7/2001 | Okada et al. | |
| 2001/0049038 A1* | 12/2001 | Dickman et al. | 429/19 |
| 2004/0175598 A1* | 9/2004 | Bliven et al. | 429/12 |
| 2006/0194082 A1* | 8/2006 | Tucker et al. | 429/9 |
| 2007/0065711 A1* | 3/2007 | Gopal | 429/38 |
| 2009/0239105 A1* | 9/2009 | Yoshida | 429/13 |

FOREIGN PATENT DOCUMENTS

| | | |
|---|---|---|
| JP | 1999-320462 | 11/1999 |
| JP | 2000-6060 | 1/2000 |
| JP | 2000-6061 | 1/2000 |
| JP | 2000-33585 | 2/2000 |
| JP | 20004-291154 | 10/2004 |
| KR | 10-2006-0057342 | 5/2006 |
| KR | 10-2005-0094600 | 4/2007 |

* cited by examiner

*Primary Examiner* — Jean F Duverne
(74) *Attorney, Agent, or Firm* — Merchant & Gould P.C.

(57) ABSTRACT

Disclosed is a hybrid-type power supplying apparatus which may use a fuel cell device as a main power supplier for a robot and a rechargeable battery as an auxiliary power supplier for the robot. In the hybrid-type power supplying apparatus, when the power consumption of the robot exceeds the selected amount of power generation of the fuel cell device, the loads of the rechargeable battery and the fuel cell stack can be managed in such a manner that power is supplied from the rechargeable battery to the robot as an auxiliary power for the robot supplementing the main power for the robot.

10 Claims, 4 Drawing Sheets

HYBRID TYPE POWER SUPPLYING APPARATUS

This application claims priority to Korean Patent Application No. 10-2008-0014068, filed on Feb. 15, 2008, and all the benefits therefrom under U.S.C. §119, the entire contents of which are hereby incorporated by reference.

BACKGROUND

1. Field

The disclosure relates to a hybrid-type power supplying apparatus including a fuel cell and a rechargeable battery, which may be effectively used as a power supply for robots.

2. Description of the Related Art

Robots, in particular, personal robots or humanoid robots can have excellent mobility and as well can be controlled remotely. Further, they can perform various operations such as house cleaning, arranging articles, cooking, and so on, which means that they are human-friendly and have a high potential of being further used.

The currently available robots, in particular the humanoid robots with a height of 1 meter or taller, may receive power from an external power supply through a cable or use a battery. For the reason, their movement range and operation time can be limited. Further, the use of the battery may be neither preferable in terms of environmental protection.

SUMMARY

When power consumption of a robot to which power is to be supplied increases and when mounting load of the robot reaches its limit, sufficient power can not be supplied stably. Further, Storage or supply of hydrogen, the fuel, to a robot power system using an existing fuel cell may be very inconvenient. The inventors have developed a novel hybrid-type power supplying apparatus.

Disclosed herein is in an exemplary embodiment wherein a hybrid-type power supplying apparatus comprises a robot; a power management device (PMD) that is connected to the robot; a fuel cell device that is connected to the PMD and includes a fuel cell stack and balance of plants (BOP) for operating the fuel cell stack; a rechargeable battery that is connected to the PMD; and an operation control device that is connected to the fuel cell device and the PMD and controls the operation of the BOP. The PMD may manage the power from the rechargeable battery to be supplied to the fuel cell device as a driving power for the fuel cell device. Further, the PMD may manage the power generated from the fuel cell stack to be supplied to the robot as a main power for the robot. When the total amount of power consumed in the robot, the BOP, the operation control device, and the PMD exceeds the power generated by the fuel cell stack, the PMD may manage the loads of the rechargeable battery and the fuel cell stack so that power is supplied from the rechargeable battery to the robot as an auxiliary power for the robot supplementing the main power for the robot.

According to the above-mentioned embodiment, sufficient and stable power can be supplied even when a rapid load variation occurs, while the operation time and the radius of action of the robot to which power is to be supplied can be increased. Further, since the liquid-type fuel cell can be used for the apparatus, fuel can be easily carried and supplied to the apparatus, which means that the hybrid-type power supplying apparatus can be effectively used for robot power systems.

BRIEF DESCRIPTION OF THE DRAWINGS

The above and other objects, features and advantages of the disclosed embodiments will be more apparent from the following detailed description taken in conjunction with the accompanying drawings in which.

DETAILED DESCRIPTION OF EMBODIMENTS

Figure 1:
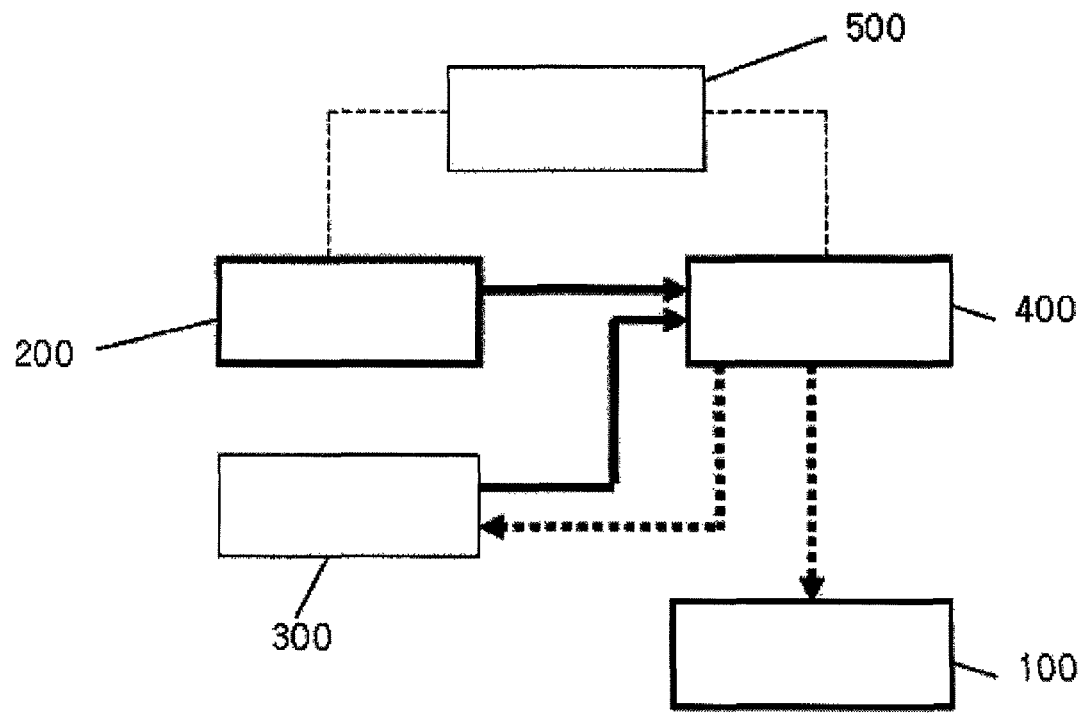
FIG. 1 is a schematic view of a hybrid-type power supplying apparatus according to an embodiment.

Exemplary embodiments now will be described more fully hereinafter with reference to the accompanying drawings, in which exemplary embodiments are shown. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the description, details of well-known features and techniques may be omitted to avoid unnecessarily obscuring the presented embodiments.

The terminology used herein is for the purpose of describing particular embodiments only and is not intended to limit the invention. As used herein, the singular forms "a", "an" and "the" are intended to include the plural forms as well, unless the context clearly indicates otherwise. The use of the terms "first", "second", and the like do not imply any particular order, but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements and shape, size and regions, and the like, are exaggerated for clarity.

In exemplary embodiments, a fuel cell device may be used to mean a device including a fuel cell stack and its peripheral devices, i.e. balance of plants (BOP) for operating the fuel cell stack, unless expressed otherwise.

The BOP may include all peripheral devices of the fuel cell stack required for not only serving to supply fuel and air or oxygen to the fuel cell stack but also serving to adjust the concentration of the fuel, to recover water included in the air discharged from the fuel cell stack, to remove carbon dioxide included in the fuel cell discharged from the fuel cell stack, to recover non-reacted fuel and to adjust the temperature of the fuel cell stack. Non-limiting examples of the BOP includes a fuel cell pump, an air supply blower, a fuel storage tank, a fuel concentration adjustor, a fuel concentration sensor, a fuel mixer, a gas-liquid separator, a heat exchanger, a ventilator, a water storage tank, a water supply pump, any combination thereof, or the like.

In an embodiment, a hybrid-type power supplying apparatus may be provided in which the fuel cell device is used as a main power supplier for a robot i.e. machine to which power is supposed to be supplied, and a rechargeable battery is used as an auxiliary power supplier for the robot supplementing the main power from the fuel cell device.

In the hybrid-type power supplying apparatus, when the total power consumption of the hybrid-type power supplying apparatus including the robot exceeds the power generated by the fuel cell stack, the loads of the rechargeable battery and the fuel cell stack can be managed to be shared so that power can be supplied to the robot from the rechargeable battery as an auxiliary power supplementing the main power from the fuel cell stack.

FIG. 1 is a schematic view of the hybrid-type power supplying apparatus according to an embodiment.

Referring to FIG. 1, the hybrid-type power supplying apparatus according to an embodiment includes a robot 100 to which power is to be supplied, a fuel cell device 200, a rechargeable battery 300, a power management device (PMD) 400, and an operation control device 500.

As for non-limiting examples, the robot may include a biped robot, a wheeled mobile robot, and so on. Depending on the use and structure thereof, a humanoid robot, an education-purpose robot, a military-purpose robot, a quadruped robot, a guard robot, a monitoring robot, a household robot, a pet robot, and so on may be exemplified.

As described above, the fuel cell device 200 may include the fuel cell stack and the BOP.

Further, As for non-limiting examples, the BOP may include a fuel cell pump, an air supply blower, a fuel storage tank, a fuel concentration adjustor, a fuel concentration sensor, a fuel mixer, a fuel level measuring sensor, a gas-liquid separator, a heat exchanger, a ventilator, a water storage tank, a water supply pump, and so on.

The fuel cell device 200 can serve as a main power supplier which supplies power to the robot 100.

Power generated from the fuel cell stack of the fuel cell device 200 can be converted into voltages and currents by a DC/DC converter that is included in the PMD 400 so as to be supplied to the robot 100.

Meanwhile, if necessary, the power generated from the fuel cell stack of the fuel cell device 200 can also be used for charging the rechargeable battery 300. Further, as will be described below, the power can also be used as driving power for the BOP of the fuel cell device 200, the PMD 400, and the operation control device 500.

The rechargeable battery 300 may serve to supply driving power to the BOP of the fuel cell device 200, the PMD 400, and the operation control device 500.

Further, when the total power consumption of the hybrid-type power supplying apparatus exceeds the power generated by the fuel cell device 200 serving as a main power supply, the rechargeable battery 300 serving as an auxiliary power supplier supplementing for the main power can supply power to the robot 100.

As for non-limiting examples of rechargeable battery 300, a lithium ion battery, a lithium polymer battery, a nickel-metal hydride battery, a lead acid battery, a nickel-cadmium battery, a super capacitor or the like can be used.

The rechargeable battery 300 may include a charge quantity notifying device which, when the charge quantity is insufficient, notifies that through a warning sound, a warning lamp, a voice, or the like.

The PMD 400 can serve to control power supply in the hybrid-type power supplying apparatus.

The PMD 400 can perform control such that the power generated from the fuel cell stack of the fuel cell device 200 is properly converted so as to be supplied to the robot 100. Further, the PMD 400 can perform control such that some of the power generated from the fuel cell stack of the fuel cell device 200, if necessary, is charged into the rechargeable battery 300 or is supplied as driving power for the BOP of the fuel cell device 200, the PMD 400, and the operation control device 500.

Further, as described earlier, when the power consumption exceeds the power generated by the fuel cell device 200 serving as a main power supply, the PMD 400 can manage the load between the rechargeable battery 300 and the fuel cell device 200 such that power is supplied to the robot 100 from the rechargeable battery device 300 serving as auxiliary power supply for the main power supply.

In the hybrid-type power supplying apparatus according to an embodiment, the power management and control of the PMD 400 can be performed on the basis of a set algorithm, an example of which will be described below.

In an exemplary embodiment, PMD 400 may include processor and/or controller programmed according to an algorithm. In an exemplary embodiment, PMD 400 may further include DC/DC converter, or DC/AC inverter, if necessary. In an alternative, hard-wired circuitry may be used in place of or in combination with the processor and/or controller programmed according to the algorithm.

The operation control device 500 can be a controller or processor like microprocessor and serve to control the operation of the BOP of the fuel cell device 200.

That is, the operation control device 500 can serve to automatically control the operation state of the BOP including a liquid pump, an air blower, a heat exchanger, a fuel concentration adjustor, a temperature controller, and so on in accordance with the amount of power generated from the fuel cell stack, based on an input program, such that the fuel cell stack is properly operated.

As a modification of the hybrid-type power supplying apparatus, a power substitution circuit which supplies power to the robot by using a connection plug may be used to substitute for the auxiliary power supplier of the fuel cell device 200 with or without the auxiliary power from the rechargeable battery 300, in addition to the above-described construction in which the rechargeable battery 300 is singly used as an auxiliary power supplier for the robot 100.

Figure 2:
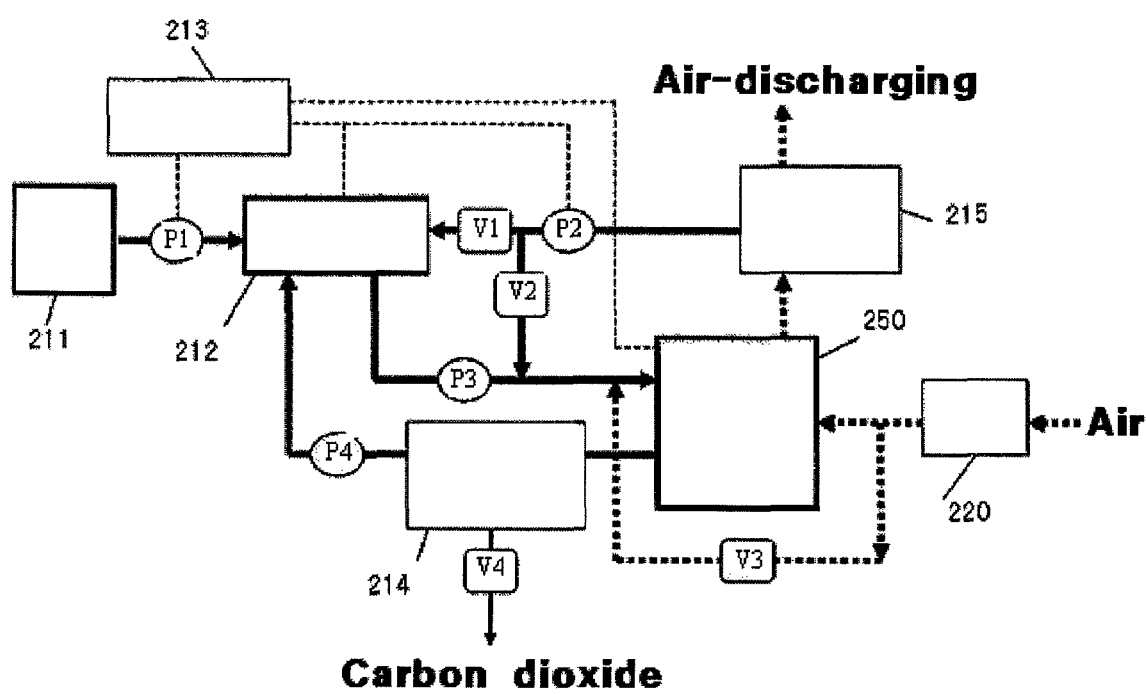
FIG. 2 is a schematic view of a fuel cell device in an embodiment.

FIG. 2 is a schematic view of the fuel cell device according to an embodiment.

Referring to FIG. 2, the power cell device 200 according to an embodiment includes a fuel cell stack 250 and BOP.

A direct liquid-type fuel cell stack may be used as the fuel cell stack 250, because the robot to which power is to be supplied can be operated stably by directly injecting liquid fuel into the fuel cell device 200, and it is easy to carry or supply the fuel.

As for non-limiting examples, the liquid fuel of the direct liquid-type fuel cell may include methanol, ethanol, dimethyl ether, formic acid, isopropanol, ethylene glycol, glycerol, any mixture thereof, or the like.

The BOP can be by and large divided into a fuel supply device and an air (or oxygen) supply device.

The fuel supply device can include a fuel storage device 211, a fuel mixer 212 which is connected to the fuel storage device 211 so as to supply fuel with a constant concentration to the fuel cell stack 250, a fuel recovery and supply device 214 which recovers and separates non-reacted liquid fuel remaining in the fuel cell stack 250 and a gas product, reduces the temperature of the non-reacted liquid fuel and supplies to the fuel mixer 212, a water recovery and supply device 215 which recovers and stores water flowing along with the air from a cathode of the fuel cell stack 250 and supplies the water to the fuel mixer 212, a concentration adjusting device 213 which is connected to the fuel storage device 211 and the water recovery and supply device 215 and performs control such that the fuel concentration of the fuel mixer 212 can be maintained at a constant concentration, and a plurality of pumps P1 to P4 and valves V1 to V3 which are interposed between the respective devices.

The fuel storage device 211 can store highly concentrated fuel. When the fuel mixture within the fuel mixer 212 is consumed by the operation of the robot 100, the pump P1 connected between the fuel storage device 211 and the fuel mixer 212 can supply a required amount of high-concentration fuel to the fuel mixer 212 from the fuel storage device 211.

The fuel storage device 211 may include an alarming device which, when the amount of fuel in the fuel storage device 211 becomes smaller than the minimum required amount, notifies it through an alarming sound or voice, for example.

The fuel mixer 212 may include a fuel level measuring sensor and a fuel level adjusting device which adjusts an amount of fuel or water flowing into the fuel mixer 212 in accordance with the fuel level measured by the fuel level measuring sensor or adjusts an amount of fuel mixture flowing out of the fuel mixer 212, such that the level of the fuel mixture is adjusted.

Further, the fuel mixer 212 may include an ion removing device for removing ions within non-reacted liquid fuel flowing out of the fuel cell stack 250.

Further, the fuel mixer 212 may include an alarming device which, when the amount of fuel mixture within the fuel mixer 212 becomes smaller than the minimum required amount, notifies it to a user through an alarming sound or voice, for example.

The fuel mixture from the fuel mixer 212 is supplied to the fuel cell stack 250 by the pump P3.

To maintain proper fuel concentration required for the fuel cell stack 250, the concentration adjusting device 213 uses a concentration sensor or a concentration control device without sensor (in the latter case, a methanol concentration sensor may not be used, but methanol consumption in the fuel cell stack may be predicted to control the concentration) so as to measure or predict the concentration of the fuel within the fuel mixer, and adjusts the concentration by adjusting an amount of fuel flowing into the fuel mixer 212 from the fuel storage device 211 and an amount of water flowing into the fuel mixer 212 from the water recovery and supply device 215, based on the measured or predicted concentration.

The fuel recovery and supply device 214 can recover the non-reacted fuel liquid flowing out of an anode of the fuel cell stack 250 and then supply the recovered fuel liquid to the fuel mixer 212.

The fuel recovery and supply device 214 may include a heat exchanger for reducing the temperature of the non-reacted fuel liquid flowing out of the fuel cell stack, an ion removing device for removing ions within the non-reacted fuel liquid flowing out of the fuel cell stack, and a level adjusting device for adjusting the level of the non-reacted fuel liquid stored therein.

Further, the fuel recovery and supply device 214 may include a carbon dioxide removing device which can selectively remove carbon dioxide when the pressure of the carbon dioxide, which is a reaction product, within the recovered fuel increases above a predetermined value. For example, the on/off valve V4 is automatically opened by a spring, or a semi-permeable membrane is installed, so as to remove the carbon dioxide.

The fuel recovered from the fuel recovery and supply device 215 through the pump P4 is supplied to the fuel mixer 212.

Both or either of the fuel circulation pumps P3 and P4 may be installed.

The water recovery and supply device 215 can recover water included in the air flowing out of an outlet at the cathode of the fuel cell stack 250, and then supply the recovered water to the fuel mixer 212.

The water recovery and supply device 215 may include a heat exchanger or gas-liquid separating membrane which separates water from the air flowing out of the outlet, and a water storage and supply device which stores the separated water and then supplies the stored water to the fuel mixer 212. The water storage and supply device may include a level adjustor which adjusts the level of water stored in the water storage and supply device, and an alarming device which, when the amount of water within the water storage and supply device is smaller than the minimum required amount, notifies this to a user through an alarming sound or voice.

The water recovered from the water recovery and supply device 214 through the pump P2 can be supplied to the fuel mixer 212.

The air supply device can include an air or oxygen blower or a compressor 220 which adjusts a flow rate of air. The air supply section may further include an air or oxygen bottle.

The above-described pumps P and valves V of the fuel cell device can be opened and closed by a preset algorithm, which will be described below. If necessary, further pumps or valves may be added, and one or more of the pumps P and valves V may be removed.

Returning to FIG. 1, the rechargeable battery 300 provides driving power to the BOP of the fuel cell device 200 and the operation control device 500, which operates the BOP, through the PMD 400. Accordingly, the BOP including the pumps and the blower can be operated to supply fuel and air to the fuel cell stack 250. Then, power can be generated from the fuel cell stack 250.

As described above, the generated power can be not only supplied to the robot 100 through the PMD 400, but also be used as power for charging the rechargeable battery 300. Further, the generated power can be supplied again to the BOP and the operation control device 500 to thereby drive the fuel cell stack 250.

Hereinafter, a hybrid-type power supplying method according to an embodiment will be described with reference to FIGS. 1 and 2.

First, the rechargeable battery 300 can supply power to the BOP of the fuel cell stack 200 and the operation control device 500, such that the temperature of the fuel cell stack 250 increases to a selected temperature (for example, about 30° C. to about 80° C.).

Then, the fuel cell stack 250 can generate power to drive the robot 100 and to charge the rechargeable battery 300 and provide power required for the BOP and the operation control device 500.

Meanwhile, even after the operation of the robot 100 is finished, the rechargeable battery 300 can be charged with the power generated from the fuel cell stack 250 until extra power of the rechargeable battery 300 approaches a selected amount (for example, about 80% to about 100%, for another example, about 95% or more).

When the operation of the fuel cell stack 250 is stopped, the rechargeable battery 300 can supply power to the BOP of the fuel cell device and the operation control device 500 so as to remove the methanol from the fuel cell stack 250 by opening the valve V3 to introduce air to the stack 250 and to reduce the temperature of the fuel cell stack 250 below a predetermined temperature (for example, about 20° C. to about 50° C.).

Figure 3:
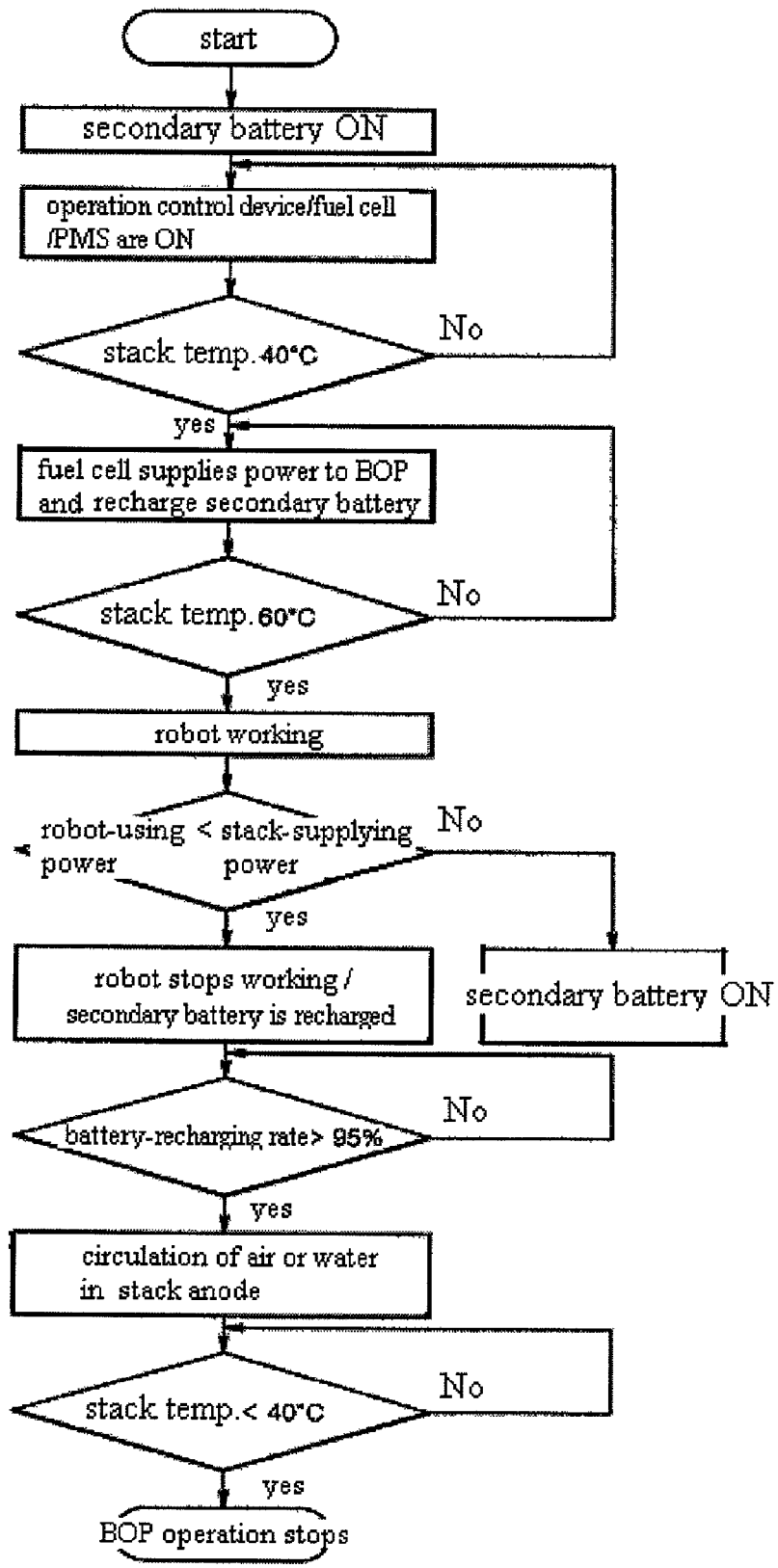
FIG. 3 is a flow chart showing algorithm for a hybrid-type power supplying apparatus according to an embodiment.

FIG. 3 is a flow chart showing an example of an algorithm for implementing a high load sharing ratio when the hybrid-type power supplying apparatus including the fuel cell device and the rechargeable battery supplies power.

Referring to FIG. 3, at first, the rechargeable battery is turned on so as to supply power to the PMD, the operation control device and the BOP of the fuel cell device. When the temperature of the fuel cell stack approaches a first temperature (for example, about 40° C.), the fuel cell stack supplies power to the PMD, the operation control device and the BOP of the fuel cell device, and at the same time, charges the rechargeable battery.

When the temperature of the fuel cell stack approaches a second temperature (for example, about 60° C.), the robot is turned on, and the power generated from the fuel cell stack is supplied to the robot so as to operate the robot.

When the total power consumption (the total amount of power consumed by the robot, the BOP, the operation control device, and the PMD) is larger than the power generated by the fuel cell stack of which the maximum power or current to be drawn is limited to a selected value, the rechargeable battery supplies power to the robot such that the overload of the fuel cell device can be prevented. However, when the total power consumption is smaller than the power generated by the fuel cell stack, the rechargeable battery does not supply power.

In the above-described hybrid-type power supplying system, a rapid load variation beyond an expected extent can occur, depending on the operation situations of the robot. In this case, the rechargeable battery is operated to prevent the stoppage of the robot caused by slow response of the fuel cell device.

Meanwhile, although the operation of the robot is stopped, the fuel cell stack charges the rechargeable battery such that the power of the rechargeable battery approaches a selected level (for example, about 80% to about 100%, for another example, about 95% or more). After the charging is finished, the operation of the fuel cell stack may be stopped.

After that, the rechargeable battery can supply power to the water recovery and supply device so as to wash out the fuel remaining in the fuel cell stack (the pump 2 is operated, the valve V1 is closed, and the valve V2 is opened) or to remove the fuel by blowing air (the pump P3 is stopped and the valve V3 is opened). When the temperature of the fuel cell stack decreases below the first temperature (for example, about 40° C.), the operation of the BOP is stopped completely (refer to FIG. 2).

The invention will now be described in further detail with reference to the following examples. The following examples are for illustrative purposes only and not intended to limit the scope of the claimed invention.

Figure 4:
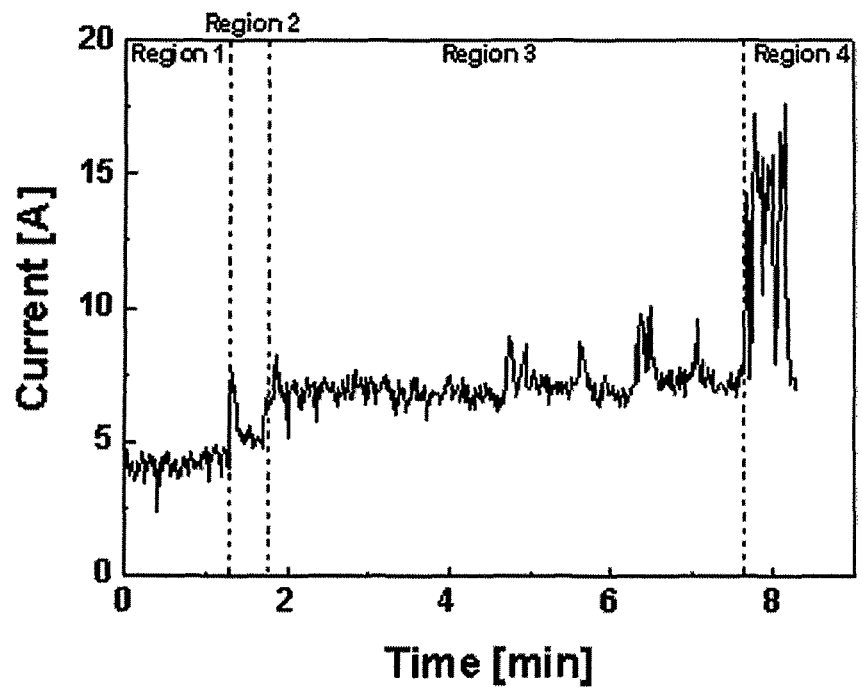
FIG. 4 is a graph showing power consumption depending on operation of a robot, in case that a hybrid-type power supplying apparatus according to an embodiment is applied to the robot.

FIG. 4 is a graph showing the power consumption depending on the operation of a biped robot, to which power is to be supplied, when the hybrid-type power supplying apparatus according to the invention is applied to the biped robot.

As for non-limiting examples, the biped robot used herein is 125 cm tall, weighs 70 kg, and has 41 DOFs (degrees of freedom). Further, the maximum speed of the biped robot is 0.95 km/hr. The biped robot can walk in all directions, and can be controlled in a wired or wireless manner.

Referring to FIG. 4, the region 1 indicates a preparation state, the region 2 indicates a state where the posture of the robot is compensated, the region 3 indicates a state where the robot performs an operation such as walking in one spot, waving hands, talking with hands, or shaking hands, and the region 4 indicates a state where the robot walks. FIG. 4 shows the results obtained by measuring power consumptions at the respective regions.

Figure 5:
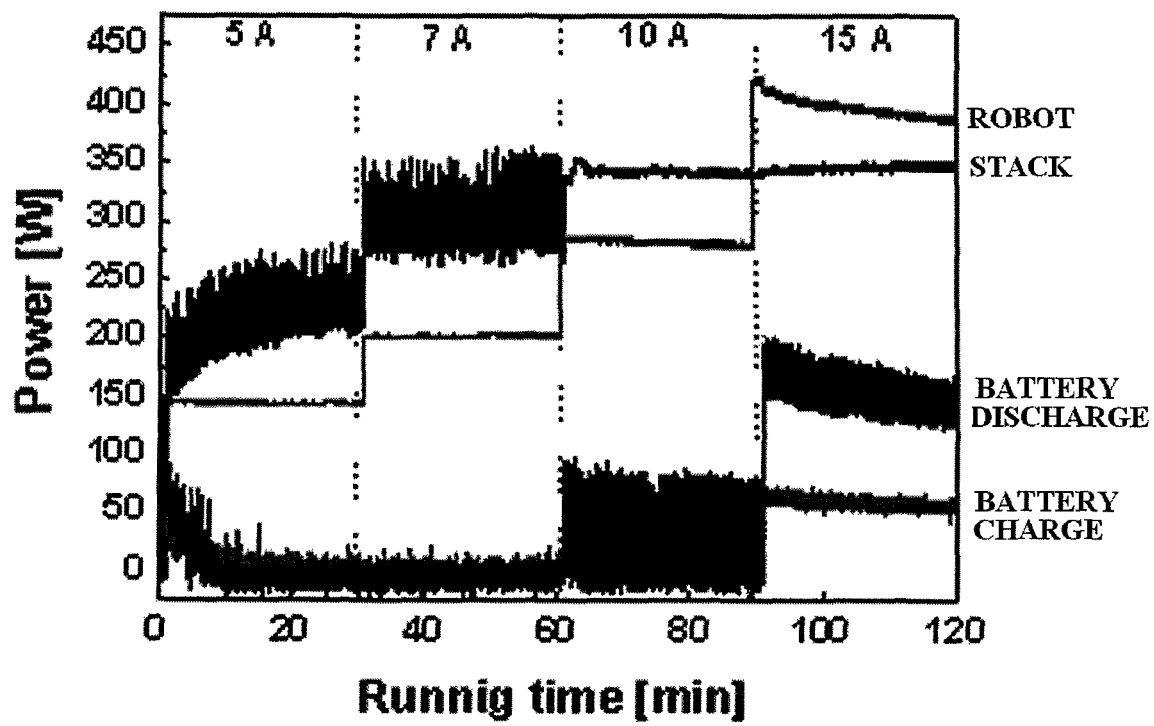
FIG. 5 is a graph showing power charge and discharge results of fuel cell stack and rechargeable battery depending on operation of robot, based on measurement results obtained at respective regions of FIG. 4.

FIG. 5 is a graph showing the power charge and discharge results of the fuel cell stack and the rechargeable battery depending on the operation of the robot, based on the measurement results obtained at the respective regions of FIG. 4.

When the robot starts an operation, power is supplied from the fuel cell stack, and the power of the rechargeable battery consumed by the BOP is replenished by the fuel cell stack. Ten minutes after the fuel cell stack is operated, the rechargeable battery is charged completely, and the power generated from the fuel cell stack is supplied only to the robot and the BOP.

In the region 2, the robot uses only the power supplied from the fuel cell stack. In region the 3, the power of the rechargeable battery is consumed in addition to the power generated from the fuel cell stack, depending on the load variation of the robot.

In the region 4, it can be found that the power consumed in the robot, the BOP of the fuel cell device, and the operation control device is supplied simultaneously from the fuel cell stack and the rechargeable battery.

Figure 6:
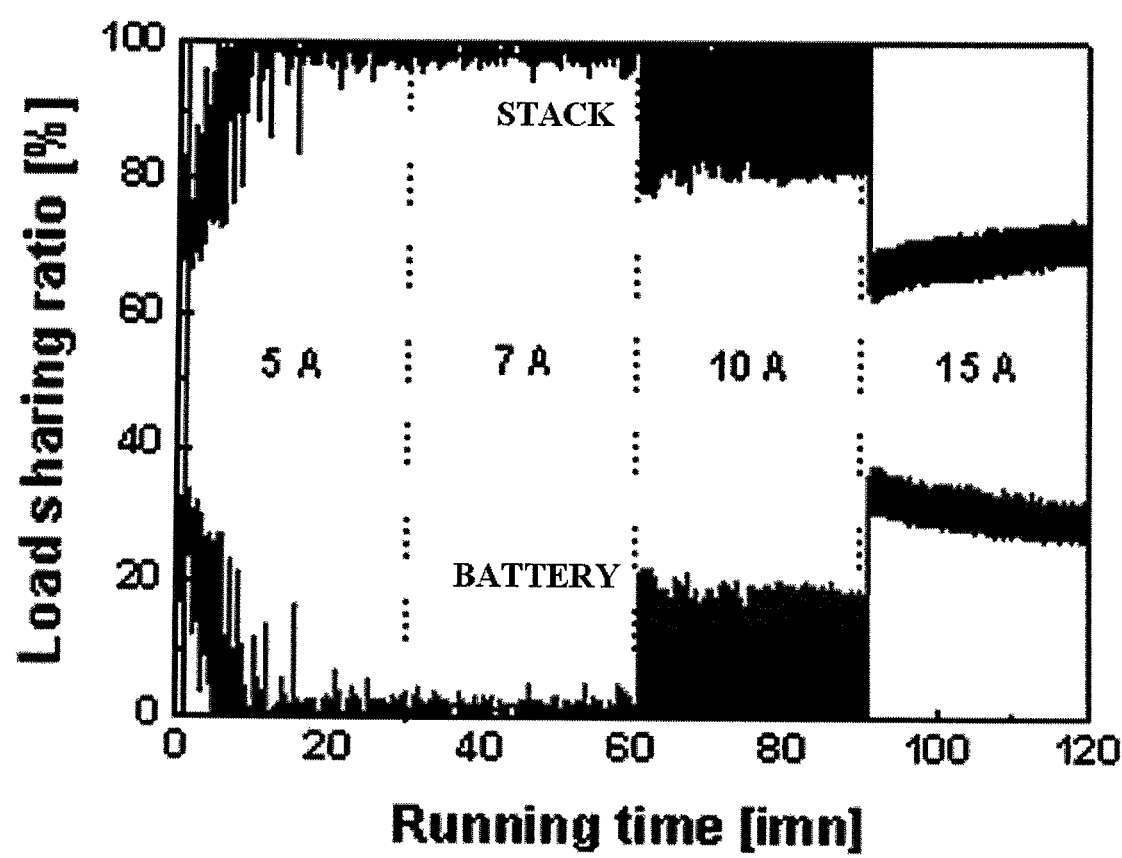
FIG. 6 is a graph showing results obtained by calculating load sharing ratio of fuel cell stack and rechargeable battery on the basis of charge and discharge results of the fuel cell stack and the rechargeable battery, depending on operation of robot.

FIG. 6 is a graph showing the results obtained by calculating the load sharing ratio between the fuel cell stack and the rechargeable battery on the basis of the charge and discharge results of the fuel cell stack and the rechargeable battery, depending on the operation of the robot.

Referring to FIG. 6, in the region 1, power consumed in the robot and the BOP is supplied from the fuel cell stack except for the first ten minutes. In the region 2, all the consumed power is also supplied from the fuel cell stack.

In the region 3, the load is constantly shared since the power of the rechargeable battery is consumed due to the load variation of the robot. In the region 4, the load sharing ratio of the fuel cell stack is about 1.8 times larger than that of the rechargeable battery.

According to the above-described hybrid-type power supplying apparatus including the fuel cell and the rechargeable battery, sufficient and stable power can be supplied, even when a rapid load variation occurs, while the operation time and the radius of action of the robot are increased.

While the invention has been shown and described with reference to certain exemplary embodiments thereof, it will be understood by those skilled in the art that various changes in form and details may be made thereto without departing from the spirit and scope of the invention as defined by the appended claims.

In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguished one element from another. Furthermore, the use of the terms a, an, etc. do not denote a limitation of quantity, but rather denote the presence of at least one of the referenced item.

What is claimed is:

1. A hybrid-type power supplying apparatus comprising:
a robot;
a power management device that is connected to the robot;
a fuel cell device that is connected to the power management device and includes a fuel cell stack and balance of plants for operating the fuel cell stack;
a rechargeable battery that is connected to the power management device; and
an operation control device that is connected to the fuel cell device and the power management device and controls the operation of the balance of plants,
wherein the power management device manages the power from the rechargeable battery to be supplied to the fuel cell device as a driving power for the fuel cell device, and manages the power generated from the fuel cell stack to be supplied to the robot as a main power for the robot,
when the total amount of power consumed in the robot, the balance of plants, the operation control device, and the power management device exceeds the power generated by the fuel cell stack, the power management device manages the loads of the rechargeable battery and the fuel cell stack so that power is supplied from the rechargeable battery to the robot as an auxiliary power for the robot supplementing the main power for the robot,
wherein the balance of plants includes a fuel supply device and an air supply device, and the fuel supply device includes:
a fuel storage device which stores fuel;
a fuel mixer which is connected to the fuel storage device so as to supply fuel with a constant concentration to the fuel cell stack;
a fuel recovery and supply device which recovers non-reacted fuel liquid from the fuel cell stack and then supplies the non-reacted fuel liquid to the fuel mixer;
a water recovery and supply device which recovers water flowing with the air from the fuel cell stack and then supplies the water to the fuel mixer; and
a concentration adjusting device which is connected to the fuel storage device and the water recovery and supply device and controls the fuel concentration of the fuel mixer at a constant concentration.

2. The hybrid-type power supplying apparatus according to claim 1, wherein the fuel storage device includes an alarming device which notifies that an amount of fuel is smaller than the minimum required amount.

3. The hybrid-type power supplying apparatus according to claim 1, wherein the concentration adjusting device measures and/or predicts the consumed amount and the concentration of liquid mixture in the fuel cell stack, and adjusts the concentration of the liquid mixture by adjusting an amount of fuel and water flowing into the fuel mixer on the basis of the measured and/or predicted amount and concentration.

4. The hybrid-type power supplying apparatus according to claim 1, wherein the fuel mixer includes:
a level measuring sensor which measures the level of fuel mixture;
a level adjusting device which controls the flowing-out of the liquid mixture in accordance with the measured level of the fuel mixture and adjusts the level of the liquid mixture by controlling an amount of fuel and water flowing into the fuel mixer; and
an alarming device which notifies that the amount of the fuel mixture becomes smaller than the minimum required amount.

5. The hybrid-type power supplying apparatus according to claim 1, wherein the fuel mixer includes an ion removing device which removes ions within the non-reacted fuel liquid flowing out of the fuel cell stack.

6. The hybrid-type power supplying apparatus according to claim 1, wherein the fuel recovery and supply device includes:
a heat exchanger which reduces the temperature of the non-reacted fuel liquid;
an ion removing device which removes ions within the non-reacted fuel liquid; and
a carbon dioxide removing device which detects whether the pressure of carbon dioxide within the non-reacted fuel liquid increases above a selected pressure, and removes the carbon dioxide in accordance with the detection result.

7. The hybrid-type power supplying apparatus according to claim 1, wherein the water recovery and supply device includes:
a heat exchanger which recovers water included in the air flowing out of the fuel cell stack; and
a water storage and supply device which stores the recovered water and then supplies the stored water to the fuel mixer.

8. The hybrid-type power supplying apparatus according to claim 7, wherein the water storage and supply device includes a level adjustor which adjusts the level of the water by controlling the flowing-in of the recovered water and the flowing-out of the stored water; and an alarming device which notifies that the amount of the water becomes smaller than the minimum required amount.

9. A hybrid-type power supplying apparatus comprising:
a robot;
a power management device that is connected to the robot;
a fuel cell device that is connected to the power management device and includes a fuel cell stack and balance of plants for operating the fuel cell stack;
a rechargeable battery that is connected to the power management device; and
an operation control device that is connected to the fuel cell device and the power management device and controls the operation of the balance of plants,
wherein the power management device manages the power from the rechargeable battery to be supplied to the fuel cell device as a driving power for the fuel cell device, and manages the power generated from the fuel cell stack to be supplied to the robot as a main power for the robot,
when the total amount of power consumed in the robot, the balance of plants, the operation control device, and the power management device exceeds the power generated by the fuel cell stack, the power management device manages the loads of the rechargeable battery and the fuel cell stack so that power is supplied from the rechargeable battery to the robot as an auxiliary power for the robot supplementing the main power for the robot, wherein the rechargeable battery supplies power to the balance of plants, the power management device, and the operation control device so as to drive the fuel cell device, the power generated from the fuel cell stack is supplied as charge power of the rechargeable battery, is supplied as driving power to the balance of plants, the power management device, and the operation control device, or is supplied to the robot, after the operation of the robot is stopped, the power generated from the fuel cell stack is supplied as charge power of the rechargeable battery, after the charging of the rechargeable battery is completed, the operation of the fuel cell stack is stopped, and after the operation of the fuel cell stack is stopped, the rechargeable battery supplies power to the balance of plants and the operation control device such that pure water or air which does not contain fuel is supplied to an anode of the fuel cell stack to thereby remove non-reacted fuel remaining in the anode of the fuel cell stack.

10. The hybrid-type power supplying apparatus according to claim 9, wherein the power generated from the fuel cell stack is supplied as charging power of the rechargeable battery or is supplied as driving power to the balance of plants and the operation control device until the temperature of the fuel cell stack approaches a first temperature, and when the temperature of the fuel cell stack approaches a second temperature which is higher than the first temperature, the power generated from the fuel cell stack is supplied to the robot.

* * * * *